April 23, 1929.  L. G. COPEMAN  1,710,406
REFRIGERATING APPARATUS
Filed June 16, 1926   2 Sheets-Sheet 2
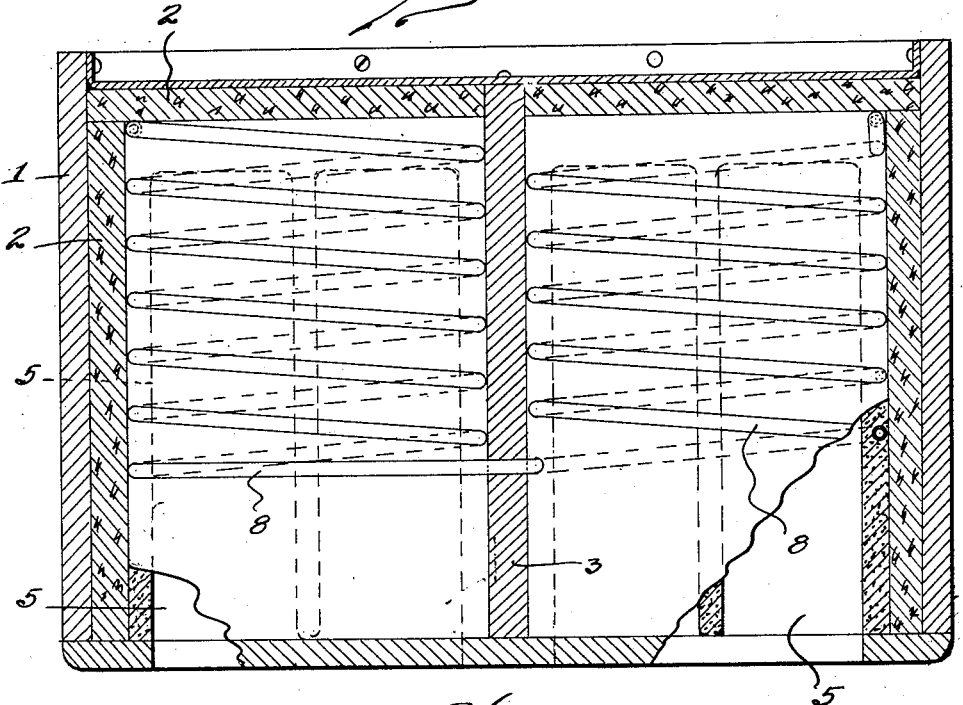
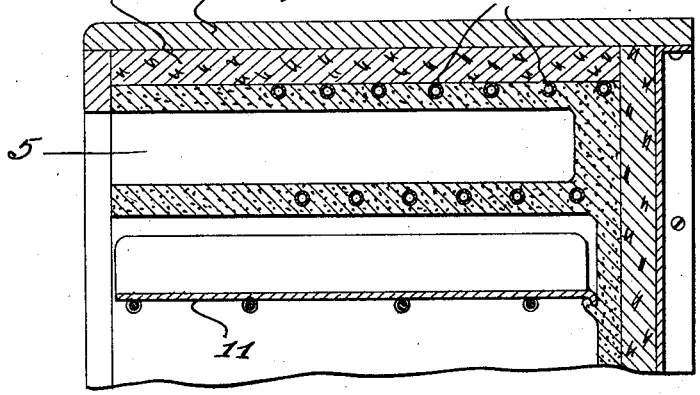
INVENTOR.
Lloyd G. Copeman.
BY
Stuart C. Barnes
ATTORNEY.

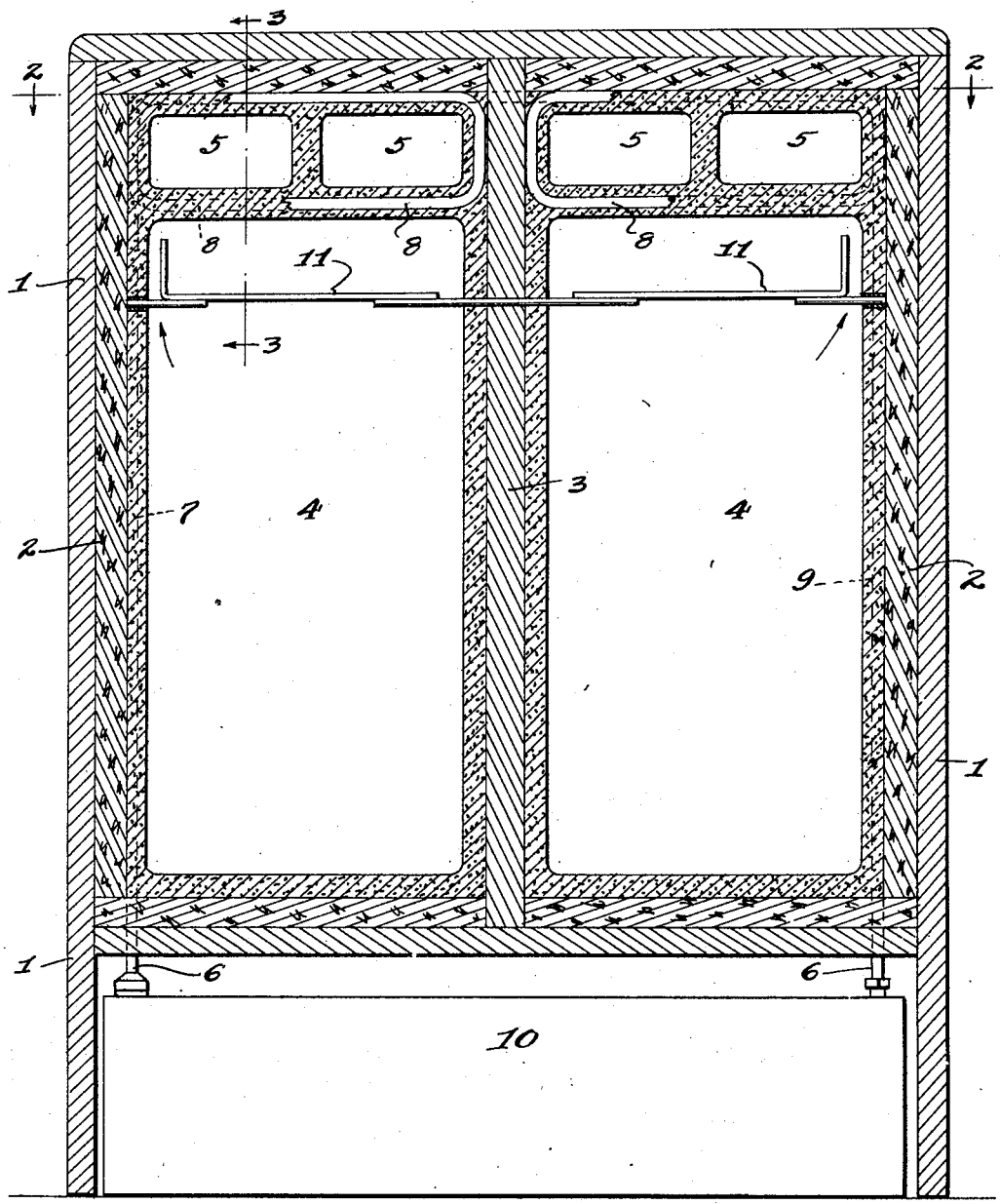

Patented Apr. 23, 1929.

1,710,406

UNITED STATES PATENT OFFICE.

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN.

REFRIGERATING APPARATUS.

Application filed June 16, 1926. Serial No. 116,322.

This invention relates to refrigerating apparatus and has to do particularly with a novel combination of refrigerating apparatus and refrigerator cabinet to produce a complete, compact and efficient domestic refrigerating unit.

Domestic refrigeration is fast coming into its own. During the past few years great strides have been made in perfecting and developing the refrigerator unit, and particularly the cooling, or expansion unit. These efforts in developing the automatic domestic refrigerator have been directed almost entirely to the various parts of the refrigerating apparatus, and some of these efforts have been directed towards the provision of an efficient, compact, cooling unit of the flooded type, and provision of various coils to increase the surface capacity, and the positioning of such coils within the refrigerating chamber of the refrigerator. Other efforts have been directed toward the development of a cooling unit of the type known as the direct expansion type wherein the expansion coils for the device are usually located within a brine tank, positioned in the refrigerating chamber.

It is my conception that this development has been proceeding along the wrong line, and I have therefore developed a novel refrigerating and cooling unit which presents the same great surface area as the cooling units of the prior art, but which cooling unit forms an integral part of the refrigerator, and does not deprive the user of any storage space. Another feature of my novel refrigerating unit and cooling unit is that the cooling unit is so positioned with relation to the refrigerating chamber of the refrigerator that the use of a brine tank and its accompanying disadvantages are entirely obviated, while at the same time retaining all the advantages of a brine tank without taking up any of the space heretofore necessary. A further object of my invention has to do with the elimination of what has been hitherto known as the side icing, or refrigerating chamber of the refrigerator, and the positioning of the cooling means or cooling unit at the top of the refrigerator whereby I am able to obtain a maximum of efficiency in operation together with a maximum amount of storage space.

In the drawings:

Fig. 1 is a vertical sectional view of my novel refrigerating unit illustrating the manner of arranging and combining the food chambers and the refrigerating chambers of the refrigerator.

Fig. 2 is a section taken on line 2—2 of Fig. 1 and illustrating the preferred manner of imbedding the expansion coils in the top wall of the refrigerating chambers and around the containers for the ice tray whereby such expansion coils serve a double purpose of providing a sharp freezer and cooling the food chamber without taking up any additional space.

Fig. 3 is a fragmentary section taken on line 3—3 of Fig. 1 and showing the positioning of the expansion coils and the ice tray receiver at the top of the refrigerator, and also showing the positioning of the baffle plate just below the expansion coils.

Refrigerators have been in practical commercial use for many years and two predominant types have established themselves as the most efficient and practical refrigerating units. One of such types of refrigerators is known as the side icer, and the other type, which is the more efficient, is known as the top icer. In automatic refrigerating apparatus the side icer type has been generally utilized and it has been customary to insert the cooling unit of the refrigerating apparatus in the chamber which has hitherto held the ice. In my co-pending application Serial No. 116,321, filed June 16, 1926, I have described and claimed a novel, complete refrigerating unit wherein the refrigerating chamber is positioned at one side and wherein the expansion coils, or conduits, are imbedded, or cast, in the walls of the refrigerating chamber. This provides a large amount of surface area for the expansion coils and at the same time presents a cold storage chamber which has hitherto been unavailable in either ice or automatic refrigerators.

The present invention is directed to the provision of a novel, complete refrigerating unit which not only contemplates the imbedding of the refrigerating coils in the cast stone walls of the refrigerator, but which also contemplates the positioning of such refrigerating coils with respect to the refrigerating chamber whereby a much more efficient, practical refrigerator unit is obtained.

In the drawings the refrigerator box is shown as comprising an outer shallow shell 1 which may be of wood, covered with "Duco" or any other preferred material. This outer shell 1 is preferably lined with an insulating material or cork board 2. A partition 3 preferably extends through the center of the refrigerator whereby to define one or more vertically elongated refrigerating chambers 4. The walls of these refrigerating chambers 4 are designed to be formed of an artificial stone composition such as oxy-chloride cement which consists of a mixture of magnesium oxide, fine sand or ground flint, or both, to which is added sufficient magnesium chloride to make a material that will be plastic, or will pour. The coils for conducting the refrigerant are preferably imbedded in these cast stone walls and in the present embodiment of my invention, the coils are preferably positioned in the upper walls of the refrigerating chamber.

Instead of positioning the coils directly in the top wall of the refrigerating chamber, they are compactly formed to define one or more small chambers 5 in the top of the refrigerating chambers, and which small chambers are designed to receive suitable trays for the manufacture of ice. In forming the interior walls of this refrigerating unit suitable cores defining the chambers 4 and 5 may be inserted in the mould formed by the refrigerator shell. These cores having been positioned and sealed, and the refrigerating coils 6 having been extended up one side adjacent the cork board, as at 7, and around the cores forming the chambers 5, as at 8, and then down adjacent the other cork board wall, as at 9, the plastic stone mix may be inserted in the space between the cores and the refrigerator shell to form the walls of the refrigerator chambers 4, and the walls of the ice cube chambers, and at the same time to completely imbed the pipes or coils 6, as at 7, 8 and 9.

It will be understood that the pipe 6, when it has reached the top of the refrigerator, may be coiled around the cores for forming the chambers 5 in the manner best illustrated in Figs. 2 and 3, but it will be also obvious that such coils may be bent and positioned adjacent the top of the refrigerating chambers, and around the ice cube chambers in any manner desired. When the cores are removed after the plastic stone composition has sufficiently set, it will be also obvious that such coils may be bent and positioned adjacent the top of the refrigerating chambers, and around the ice cube chambers in any manner desired. When the cores are removed after the plastic stone composition has sufficiently set, it will be obvious that the interior walls of the refrigerating chambers 4, and the ice cube chambers 5 will be defined by a smooth artificial stone surface. The expansion coils 6 may be connected to a suitable refrigerator unit which may be generally designated 10. The particular design of this refrigerating unit is immaterial with respect to the present invention, but it will be understood that such unit may be of any of the standard types. The coils as shown are preferably designed to be used with refrigerating units of the direct expansion type, but it will be obvious and understood that such coils may be arranged with a suitable header whereby they may be utilized in connection with a refrigerating apparatus of the flooded type.

Suitably positioned at the top of the refrigerating chambers 4, and just below the ice chambers 5, I have provided baffles 11 which are preferably L-shaped, whereby an efficient circulation of the air currents within the refrigerating chambers is obtained.

It will thus be observed that by positioning the expansion coils directly in the artificial stone walls of the refrigerator, said stone being a conductor and a good holdover, that the use of a brine tank may be completely dispensed with as far as its use as a holdover is concerned. It will furthermore be observed that by positioning the coils in the walls of the ice cube chambers and arranging such coils so as to present a maximum amount of surface area that a cooling unit will be formed which may be utilized as a sharp freezer for forming ice cubes, and at the same time be effective as a cooling unit to absorb the heat from the refrigerating chambers to cause vaporization of the refrigerant. Furthermore, by positioning the combined cooling unit and ice cube chambers at the top of the refrigerating chambers, it will be apparent that I have provided a refrigerating unit of maximum efficiency which is so positioned as to require only relatively small refrigerating apparatus and a relatively small amount of refrigerant.

What I claim is:

1. A refrigerating unit comprising a refrigerator shell shaped to form a food chamber, the side and bottom walls of said chamber being formed of artificial stone and the top wall being formed of artificial stone but shaped to provide a chamber for receiving an ice tray, or similar article and means for cooling the food chamber and ice chamber.

2. As a new article of manufacture, a refrigerating unit having a food chamber formed of artificial stone walls, one or more sharp freezing chambers having a portion thereof formed integrally with said walls and positioned at the top of said chamber, the bottom wall of said sharp freezing chamber, or chambers forming the top wall of said food chamber and cooling means in the said wall.

3. As a new article of manufacture, a refrigerating unit having a food chamber formed of artificial stone walls, one or more sharp freezing chambers positioned at the top of said chamber, the bottom of said sharp freezing chamber, or chambers, forming the top of said food chamber, and expansion coils positioned around said sharp freezing chamber, or chambers, and positioned in heat conducting relation with the walls thereof whereby to form a cooling unit for said sharp freezing chamber and said food chamber.

4. A refrigerating unit comprising a vertically elongated food chamber formed of molded stone, a molded stone top for said chamber forming in part a cooling unit, and means for receiving and circulating the volatile refrigerant positioned in heat conducting relation with said top portion only, whereby to localize the immediate heat transfer between the refrigerant and the contents of the chamber through the top portion of the chamber.

5. A refrigerating unit comprising in combination, a food chamber, a cooling unit formed of molded stone positioned at the top thereof, and forming the top wall of the chamber, and means for receiving and circulating a volatile refrigerant positioned in heat conducting relation with the walls of the cooling unit and the portion of the cooling unit forming the top of the food chamber, whereby to localize the immediate refrigerating effect to the cooling unit and the top of the food chamber.

In testimony whereof I affix my signature.

LLOYD G. COPEMAN.